(12) United States Patent
Maeda et al.

(10) Patent No.: US 12,162,986 B2
(45) Date of Patent: Dec. 10, 2024

(54) SILICONE RUBBER COMPOSITION

(71) Applicant: CANON KABUSHIKI KAISHA, Tokyo (JP)

(72) Inventors: Matsutaka Maeda, Kanagawa (JP); Yuji Kitano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 17/666,358

(22) Filed: Feb. 7, 2022

(65) Prior Publication Data
US 2022/0259381 A1 Aug. 18, 2022

(30) Foreign Application Priority Data
Feb. 12, 2021 (JP) .................................. 2021-021313

(51) Int. Cl.
| | | |
|---|---|---|
| *C08G 77/20* | (2006.01) | |
| *C08G 77/08* | (2006.01) | |
| *C08G 77/12* | (2006.01) | |
| *C08K 3/36* | (2006.01) | |
| *C08K 9/06* | (2006.01) | |
| *G03G 15/20* | (2006.01) | |

(52) U.S. Cl.
CPC ............. *C08G 77/20* (2013.01); *C08G 77/08* (2013.01); *C08G 77/12* (2013.01); *C08K 3/36* (2013.01); *C08K 9/06* (2013.01); *G03G 15/2057* (2013.01); *C08K 2201/003* (2013.01); *G03G 2215/2051* (2013.01)

(58) Field of Classification Search
CPC ........ C08G 77/20; C08G 77/12; C08G 77/08; C08K 3/36; C08K 9/06
USPC .......................................................... 524/588
See application file for complete search history.

(56) References Cited

U.S. PATENT DOCUMENTS

2007/0117920 A1* 5/2007 Hirabayashi ............ C08L 83/04
524/588

FOREIGN PATENT DOCUMENTS

| JP | H0827313 A | | 1/1996 |
|---|---|---|---|
| JP | 2007171946 A | | 7/2007 |
| JP | 2010254511 A | * | 11/2010 |
| JP | 2019031600 A | | 2/2019 |
| JP | 2020177233 A | | 10/2020 |

* cited by examiner

*Primary Examiner* — Deve V Hall
(74) *Attorney, Agent, or Firm* — Canon U.S.A., Inc. I.P. Division (57) ABSTRACT

A liquid silicone rubber composition contains metallic silicon particles. The content of the metallic silicon particles is 35% by volume or more and 45% by volume or less. The volume average particle diameter of the metallic silicon particles is 1 μm or more and 20 μm or less. The ratio A/B of viscosity A at a shear rate of 0.02/sec to viscosity B at a shear rate of 1/sec of the composition is 2.0 or less.

8 Claims, 5 Drawing Sheets

SILICONE RUBBER COMPOSITION

BACKGROUND

The present disclosure relates to a liquid silicone rubber composition for a fixing member used in a thermal fixing device of an electrophotographic image forming apparatus.

DESCRIPTION OF THE RELATED ART

In a thermal fixing apparatus of an electrophotographic image forming apparatus, a pressure contact portion is formed by a heating member and a pressing member which is arranged so as to face the heating member. When the recorded material retaining an unfixed toner image thereon is introduced into the pressure contact portion, the unfixed toner is heated and pressurized, the toner is melted, and the image is fixed on the recorded material. The heating member is a member that is in contact with the unfixed toner image on the recorded material, and the pressing member is a member that is arranged so as to face the heating member. The shape of the fixing member is for example a rotatable shape such as a roller shape and an endless belt shape. The electrophotographic member may have an elastic layer containing rubber such as crosslinked silicone rubber and thermally conductive particles on a substrate made of metal or a thermal-resistant resin.

In recent years, faster print speeds and shorter start-up times have been on an increasing trend. Accompanying the trend, the elastic layer is required to have high thermal conductivity and low thermal capacity. Japanese Patent Application Laid-Open No. 2007-171946 discloses a heat fixing roll and a heat fixing belt provided with an elastic layer made from a silicone rubber composition containing metallic silicon particles.

However, in the case where, in order to obtain the elastic layer having even higher thermal conductivity, a silicone rubber composition containing a larger amount of metallic silicon particles is prepared, the viscosity of the silicone rubber composition may increase, and the smoothness of the surface of the molded product made from the silicone rubber composition may decrease. In particular, when a molding method including a step of leveling the surface of the coating film of the silicone rubber composition is employed to form the molded product, the smoothness of the surface of the resultant product tends to particularly decrease.

SUMMARY

The present disclosure is directed to providing a liquid silicone rubber composition that makes it possible to produce a member having high thermal conductivity, low thermal capacity, and excellent surface smoothness, and a method for producing the same.

According to one aspect of the present disclosure, there is provided a liquid silicone rubber composition that contains metallic silicon particles, wherein a content of the metallic silicon particles is 35% by volume or more and 45% by volume or less, a volume average particle diameter of the metallic silicon particles is 1 µm or more and 20 µm or less, and a ratio A/B is 2.0 or less, where A denotes a viscosity of the liquid silicone rubber composition at a share rate of 0.02/sec, and B denotes a viscosity of the liquid silicone rubber composition at share rate of 1/sec. According to another aspect of the present disclosure, there is provided a liquid silicone rubber composition containing metallic silicon particles, wherein the metallic silicon particles have a mass reduction rate of 0.3% or more, the mass reduction rate being determined by steps: (i) collecting 0.5 grams of the liquid silicone rubber composition; (ii) extracting the metallic silicon particles from the sample; and (iii) subjecting the metallic silicon particles extracted from the sample to a thermosgravimetric analysis and measuring the mass reduction rate in a temperature range from 300° C. to 500° C., wherein, the step (ii) includes mixing the sample with 9 ml of toluene whose temperature is 25° C. to obtain a mixture; centrifuging the mixture at 10000 rpm for 5 minutes to obtain a precipitate; and washing the precipitate 3 times by vacuum filtration with 10 ml of toluene whose temperature is 25° C. to obtain the extracted metallic silicon particles.

Still another aspect of the present disclosure, there is provided a method of producing the above-described liquid silicone rubber composition, the method including mixing a silicone component containing organopolysiloxane with metallic silicon powder, and allowing the obtained mixture to stand for 30 days or more.

Still another embodiment of the present disclosure provides a method of producing the above-described liquid silicone rubber composition, the method including mixing a silicone component containing organopolysiloxane with metallic silicon powder using a planetary mixer under conditions of a revolution speed of 5 to 15 rpm and a mixing time of 100 to 300 minutes, and allowing the obtained mixture to stand for 4 days or more.

Further features of the present disclosure will become apparent from the following description of exemplary embodiments with reference to the attached drawings

BRIEF DESCRIPTION OF THE DRAWINGS

FIGS. 2A and 2B are schematic cross-sectional views of the fixing member according to the two embodiments of the present disclosure.

DESCRIPTION OF THE EMBODIMENTS

In the present disclosure, the description indicating a numerical range such as "XX or more and YY or less" and "XX to YY", means a numerical range including a lower limit and an upper limit which are end points, unless otherwise specified. Further, when numerical ranges are described step by step, any combinations of the upper limit and the lower limit of each of the numerical ranges are disclosed.

In the present disclosure, the electrophotographic member encompasses, for example, a heating member and a pressing member.

Figure 1:
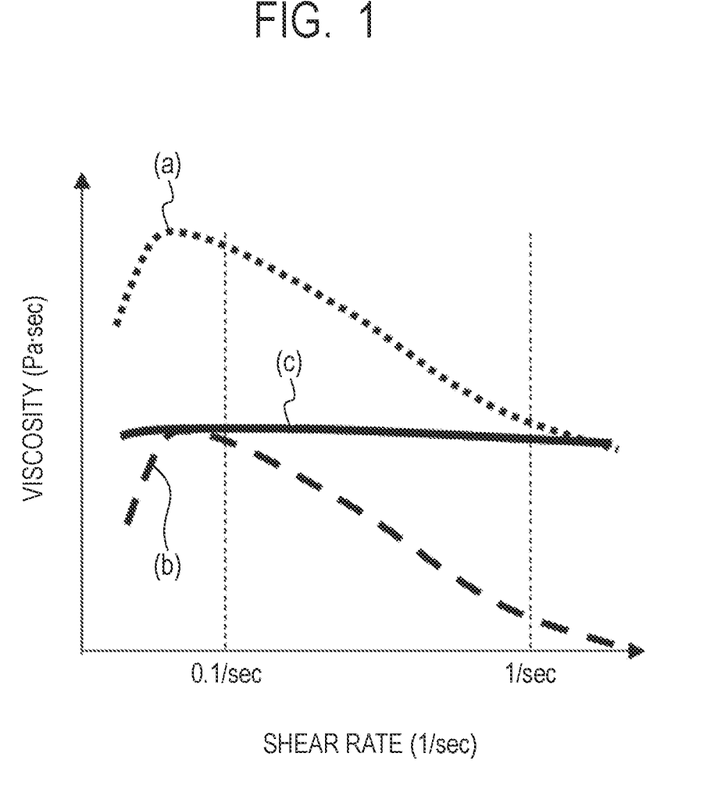
FIG. 1 is a schematic explanatory diagram (graph) showing the relationship between the shear rate and the viscosity of the liquid silicone rubber composition. The curve (a) is a composition highly filled with metallic silicon particles, the curve (b) is a composition in which the viscosity of the silicone polymer is reduced, and the curve (c) is the composition according to an embodiment of the present disclosure, each showing the relationship between the shear rate and the viscosity.

When the liquid silicone rubber composition is allowed to contain a large quantity of metallic silicon particles, the liquid silicone rubber composition shows a shear rate-dependent viscosity (see the graph of FIG. 1A). In particular, the liquid silicone rubber composition containing a large quantity of metallic silicon particles has a high viscosity in a low shear rate range of a shear rate of 0.1/sec or less, which is said to contribute to the leveling property of the surface of the coating film. As a result of that, the smoothness of the coating film decreases.

On the other hand, when the viscosity of the liquid silicone rubber composition is lowered as a whole by lowering the viscosity of the liquid silicone polymer (see the graph of FIG. 1B), the viscosity in a high shear rate range of 1/sec or more, which is related to the applicability of the liquid silicone rubber composition, is also lowered. As a result, when the coating film of the liquid silicone rubber composition is applied, sagging occurs, and it is also difficult to form a coating film having a smooth surface.

The present inventors have made studies and have found that by lowering only the viscosity in the low shear rate range without lowering the viscosity in the high shear rate range (see the graph of FIG. 1C), it is possible to achieve smoothness and coatability at the same time and to achieve the above aspect.

A liquid silicone rubber composition according to an embodiment of the present disclosure contains metallic silicon particles. A content of the metallic silicon particles is 35% by volume or more and 45% by volume or less, and a volume average particle diameter of the metallic silicon particles is 1 μm or more and 20 μm or less. Further, a ratio A/B is 2.0 or more. Here, A denotes a viscosity of the liquid silicon rubber composition measured at a shear rate of 0.02/sec., and B denotes a viscosity of the liquid silicone rubber composition measured at a shear rate of 1/sec.

The liquid silicone rubber composition according to an embodiment of the present disclosure is described in detail below based on a specific configuration.

The liquid silicone rubber composition usually contains the following components (a) to (d):
component (a): organopolysiloxane having an unsaturated aliphatic groups;
component (b): organopolysiloxane having active hydrogen bound to silicon;
component (c): a catalyst; and
component (d): metallic silicon particles.

Hereinafter, each component is described. Note that the components (a) and (b) may be collectively referred to as a liquid silicone component.

Component (a)

The organopolysiloxane having unsaturated aliphatic groups is an organopolysiloxane having unsaturated aliphatic groups such as vinyl groups, and examples thereof include those represented by the following structural formulas (1) and (2).

(1)

In the structural formula (1), $m^1$ indicates an integer of 0 or more, and $n^1$ indicates an integer of 3 or more. Further, in the structural formula (1), $R^1$ each independently represents a monovalent unsubstituted or substituted hydrocarbon group free of unsaturated aliphatic groups, where at least one of $R^1$ represents a methyl group, and $R^2$ each independently represents an unsaturated aliphatic group.

(2)

In the structural formula (2), $n^2$ represents a positive integer, and $R^3$ independently represents a monovalent unsubstituted or substituted hydrocarbon group free of unsaturated aliphatic groups, in which at least one of $R^3$ represents a methyl group, and $R^4$ each independently represent an unsaturated aliphatic group.

In the structural formulas (1) and (2), examples of the monovalent unsubstituted hydrocarbon groups and substituted hydrocarbon groups free of unsaturated aliphatic groups that can be represented by $R^1$ and $R^3$ include the following groups.

Unsubstituted Hydrocarbon Group

Alkyl groups (such as methyl groups, ethyl groups, propyl groups, butyl groups, pentyl groups, and hexyl groups).

Aryl groups (such as phenyl groups).

Substituted Hydrocarbon Group

Substituted alkyl groups (such as chloromethyl groups, 3-chloropropyl groups, 3,3,3-trifluoropropyl groups, 3-cyanopropyl groups, and 3-methoxypropyl groups).

The organopolysiloxane represented by the structural formulas (1) and (2) usually has at least one methyl group directly bonded to the silicon atom forming the chain structure. However, since it is easy to synthesize and handle, it is preferable that 50% or more of $R^1$ and $R^3$ each is methyl groups, and it is more preferable that all $R^1$ and $R^3$ are methyl groups.

Further, as the unsaturated aliphatic groups that can be represented by $R^2$ and $R^4$ in the structural formula (1) and the structural formula (2), for example, the following groups can be mentioned. That is, examples of the unsaturated aliphatic group include a vinyl group, an allyl group, a 3-butenyl group, a 4-pentenyl group, a 5-hexenyl group, and the like. Among these groups, both $R^2$ and $R^4$ are preferably vinyl groups because they are easy to synthesize and handle, inexpensive, and easily carry out a crosslinking reaction.

As the component (a), the viscosity is preferably 1000 mm²/s or more and 50000 mm²/s or less from the viewpoint of moldability. If it is 1000 mm²/s or more, it is easy to adjust the hardness to that required for the elastic layer, and if it is 50,000 mm²/s or less, the viscosity of the composition is a viscosity that makes application easy. Viscosity (kinematic viscosity) can be measured using a capillary viscometer, a rotational viscometer, or the like based on Japanese Industrial Standard (JIS) Z 8803: 2011.

The amount of the component (a) blended is preferably 55% by volume or more from the viewpoint of durability and 65% by volume or less from the viewpoint of thermal transferability, based on the liquid silicone rubber composition according to the present disclosure. That is, 55% by volume or more and 65% by volume or less are preferable.

Component (b)

Organopolysiloxane having active hydrogen bonded to silicon (Si—H bond) reacts with the unsaturated aliphatic groups of the component (a) by the action of a catalyst and functions as a crosslinking agent to form a cured silicone rubber.

As the component (b), any organopolysiloxane having a Si—H bond can be used. In particular, from the viewpoint of the reactivity with the unsaturated aliphatic groups of the component (a), those in which an average number of hydrogen atoms (Si—H bonds) bonded to silicon atoms in one molecule is 3 or more are preferably used.

Specific examples of the component (b) include a linear organopolysiloxane represented by the following structural formula (3) and a cyclic organopolysiloxane represented by the following structural formula (4)

In the structural formula (3), $m^2$ indicates an integer of 0 or more, $n^3$ indicates an integer of 3 or more, and $R^5$ each independently represents a monovalent unsubstituted or substituted hydrocarbon group free of unsaturated aliphatic groups.

In the structural formula (4), $m^3$ indicates an integer of 0 or more, $n^4$ indicates an integer of 3 or more, and $R^6$ each independently represents a monovalent unsubstituted or substituted hydrocarbon group free of unsaturated aliphatic groups.

Examples of the monovalent unsubstituted or substituted hydrocarbon group free of unsaturated aliphatic groups that can be represented by $R^5$ and $R^6$ in the structural formula (3) and the structural formula (4) include the same group as $R^1$ in the above-mentioned structural formula (1). Among these, since it is easy to synthesize and handle and excellent thermal resistance can be easily obtained, it is preferable that 50% or more of $R^5$ and $R^6$ each is methyl groups, and it is more preferable that all $R^5$ and $R^6$ are methyl groups.

Component (c)

Examples of the catalyst used for forming the silicone rubber include a hydrosilylation catalyst for accelerating the curing reaction. As the hydrosilylation catalyst, for example, a known substance such as a platinum compound or a rhodium compound can be used. The amount of the catalyst blended can be appropriately set and is not particularly limited.

Component (d)

The metallic silicon particles have a thermal capacity of about 1.7 MJ/m³·K per unit volume. This is smaller than the thermal capacity of about 3.0 MJ/m³·K per unit volume of alumina, which is often used for improving the thermophysical properties of members formed by using a silicone rubber composition. Further, the thermal conductivity of metallic silicon is as high as about 150 W/m·K.

The metallic silicon particles have a volume average particle diameter in the particle diameter range of 1 µm or more and 20 µm or less. By controlling the volume average particle diameter in the aforementioned range, larger amount of the metallic silicon particles can be contained in the liquid silicone rubber composition, and an influence of the metallic silicon particles on the surface smoothness of the coating made from the liquid silicone rubber composition can effectively be suppressed. The volume average particle diameter of the metallic silicon particles can be determined by using, for example, a laser diffraction/scattering type particle size distribution measuring device.

Further, the metallic silicon particles may be appropriately surface-treated for the purpose of improving the thermal stability, blendability, and durability of the silicone rubber composition. Specifically, it may be treated with a silane coupling agent, hexamethyldisilazane, a silicone oligomer, or the like, or a surface oxide film may be formed by thermal oxidation or oxidation by washing with water.

The content of the metallic silicon particles is 35% by volume or more and 45% by volume or less based on the volume of the liquid silicone rubber composition according to the present disclosure. When the content is 35% by volume or more, high thermal conductivity of the member made from the liquid silicone rubber composition can be expected, and when the content is 45% by volume or less, sufficient hardness and strength as the member can be obtained. The content of the metallic silicon particles can be adjusted by the charging ratio (volume basis) when preparing the liquid silicone rubber composition, and is adjusted by the volume ratio of the silicone component excluding the volatile components, such as the solvent, and the metallic silicon powder.

Note that when the content of the metallic silicon particles is to be confirmed from the member (cured product) using the liquid silicone rubber composition according to the present disclosure, the following method can be exemplified.

The contents of the cured silicone rubber and the metallic silicon particles in the member can be confirmed by using a thermogravimetric analyzer (TGA) (for example, trade name: TGA/DSC 3+, manufactured by METTLER TOLEDO). The member is cut out with a razor or the like to collect a specific amount such as 20 mg of a sample, and put the sample in the alumina pan used in the TGA. The alumina pan containing the sample is set in the TGA, and then the sample is heated from room temperature to 800° C. at a heating rate of 20° C. per minute under a nitrogen atmosphere, and further maintained at 800° C. for 1 hour. By comparing the weights before and after the measurement in this way, it is possible to obtain the mass-based contents of the cured silicone rubber component and the metallic silicon particles contained in the member. Further, by dividing the obtained mass-based content of the metallic silicon particles by the specific gravity of the metallic silicon, and by dividing the mass-based content of the cured silicone rubber component by the specific gravity of the cured silicone rubber, it is possible to calculate the content ratio of the metallic silicon particles contained in the member.

Further, the content of metallic silicon particles can also be confirmed by performing energy dispersive X-ray spectroscopy (EDS) (for example, product name: X-Max$^N$ 80, manufactured by OXFORD) on the cross section of the elastic layer and converting the obtained area ratio into a volume ratio.

In the liquid silicone rubber composition according to the present disclosure, the ratio A/B of the viscosity A with a shear rate of 0.02/sec and the viscosity B with a shear rate of 1/sec is 2.0 or less. When the ratio A/B is 2.0 or less, a liquid silicone rubber composition having excellent smoothness and coatability is obtained. The ratio A/B is preferably 1.8 or less, and more preferably 1.6 or less. The viscosity A is preferably in the range of 50 Pa·sec or more and 1000 Pa·sec or less, and the viscosity B is preferably in the range of 50 Pa·sec or more and 600 Pa·sec or less.

The viscosities A and B of the liquid silicone rubber composition according to the present disclosure can be measured by using a rotary viscometer or a rheometer. In the present disclosure, a rheometer (trade name: DHR-2; manufactured by TA Instruments) was used in the Examples described later. Then, a parallel plate having a diameter of 20 mm was used, and with a gap distance of 1 mm, a measurement temperature of 25° C., a pre-shear of 0.1/sec for 10 seconds, and a standby time of 5 seconds, the shear rate between 0.01/sec and 10/sec was measured at 10 points per decimal number, and the equilibrium time was 3 seconds and the data acquisition time was 3 seconds at each point. From the relationship between the obtained shear rate and the viscosity, the viscosity A at 0.02/sec and the viscosity B at 1/sec were read, and the ratio (A/B) between them was calculated.

In addition to the above components, the liquid silicone rubber composition according to the present disclosure may contain a reinforcing filler such as fumed silica, precipitated silica, fused silica, sol-gel method spherical silica, and crystalline silica, if necessary. Further, the liquid silicone rubber composition according to the present disclosure may also contain a thermal resistance improver such as iron oxide or cerium oxide, and a reaction control agent such as a nitrogen compound or an acetylene compound. These optional components can be arbitrarily blended as long as the effects of the present disclosure are not impaired.

As shown in FIG. 1, the liquid silicone rubber composition according to the present disclosure has a high content of metallic silicon particles, that is, it has a small shear rate dependence despite being highly filled with the metallic silicon particles. That is, even if the viscosity B in the high shear rate region is high to some extent, the viscosity A in the low shear rate region can be low. Therefore, the liquid silicone rubber composition can suppress the occurrence of sagging when forming a coating film thereof. Moreover, the leveling property of the surface of the obtained coating film is excellent. As a result, the liquid silicone rubber composition according to the present disclosure can give a molded product having excellent surface smoothness.

It is considered that the reason why the liquid silicone rubber composition according to the present disclosure exhibits the above-mentioned characteristics is that so-called "bound rubber" is formed on the metallic silicon particles contained in the liquid silicone rubber composition.

"Bound rubber" is a phenomenon state that occurs mainly in a rubber composition containing carbon black, which is known in the tire industry. Specifically, when, from an unvulcanized rubber composition containing a filler such as carbon black, the filler is extracted using a solvent capable of solving the unvulcanized rubber, the rubber that binds to the filler and does not elute is called "bound rubber" (see Japanese Patent Application Laid-Open No. H08-27313).

The present inventors measured the amount of silicone rubber still bonded to the metallic silicon particles as the amount of bound rubber by thermogravimetric analysis of the metallic silicon particles extracted from the liquid silicone rubber composition. As a result, it was found that the liquid silicone rubber composition having a small shear rate dependence had a large amount of bound rubber. It is generally said that the viscosity of a particle dispersion system in a low shear rate range depends on the interface state between the particles and the matrix. That is, a large amount of silicone rubber is bonded as bound rubber to the metallic silicon particles in the liquid silicone rubber composition according to the present disclosure. As a result, it is considered that the viscosity in the low shear rate region was reduced due to the improvement in the slipperiness between the metallic silicon particles and the silicone rubber as a matrix having the metallic silicon particles dispersed therein.

From the above, the liquid silicone rubber composition according to the present disclosure can also be expressed as a silicone rubber composition in which a large amount of silicone rubber as a bound rubber is bonded to metallic silicon particles.

In the present disclosure, the amount of this bound rubber is defined by the mass reduction rate in a specific temperature range in the thermogravimetric analysis of metallic silicon particles extracted from the liquid silicone rubber composition by a specific method. That is, the liquid silicone rubber composition according to another embodiment of the present disclosure is a liquid silicone rubber composition containing metallic silicon powder, in which the mass reduction rate is 0.3% or more.

Since the mass reduction rate of the metallic silicon powder is 0.3% or more, in the liquid silicone rubber composition according to the present disclosure, it is considered that the silicone rubber as bound rubber is bonded to the metallic silicon particles in a certain amount or more. As a result, the liquid silicone rubber composition according to the present disclosure can provide a molded product having excellent surface smoothness.

Hereinafter, a method for measuring the amount of bound rubber bonded to the metallic silicon particles is specifically described.

The amount of bound rubber of the metallic silicon particles in the liquid silicone rubber composition is determined using a thermogravimetric analyzer (TGA). A 0.5 g sample is collected from the liquid silicone rubber composition and mixed with 9 ml of toluene at a temperature of 25° C. Then, a centrifuge (manufactured by Kubota Corporation Co., Ltd.: High Speed Refrigerated Centrifuge 7780) is used to precipitate the metal silicon particles by centrifugation under the conditions of a temperature of 25° C. and 10000 rpm for 5 minutes. The obtained precipitates are subjected to vacuum filtration washing three times with 10 ml of toluene at a temperature of 25° C. using a Kiriyama funnel having a diameter of 40 mm and a filter paper No. 5C (reserved particles 1 μm) for the Kiriyama funnel to separate metallic silicon particles.

Since the uncured silicone rubber component is soluble in toluene, the silicone rubber that is not firmly adsorbed on the metallic silicon particles is removed. The obtained metallic silicon particles are dried at a temperature of 120° C. for 1 hour, weighed at 50 mg, and TGA measurement is performed. Specifically, the temperature is raised from 50° C. to 500° C. at a rate of 5° C./min under 80 ml/min of dry air, and the mass change at that time is measured. From the obtained mass change data, the mass change at a temperature of 300 to 500° C. is calculated, and the mass reduction rate (%) from 300° C. to 500° C. is obtained. Since the data of the mass change at a temperature of less than 300° C. is affected by the remaining moisture and toluene, the mass change in the temperature range of 300 to 500° C. is used as the amount of bound rubber firmly adsorbed on the metallic silicon particles. In the temperature range of 300° C. to 500° C., the mass does not change for the metallic silicon particles alone, or slight oxidization occurs to increase the mass. On the other hand, the the metallic silicon particles strongly adsorbed by silicone rubber is observed to decrease in mass because the silicone rubber decomposes from a temperature of about 300° C.

The following methods can be mentioned as a method for increasing the amount of bound rubber of the metallic silicon particles. Here, in the present disclosure, the metallic silicon particles before blending with the liquid silicone rubber components, may be referred to as "metallic silicon powder".

(i) A method in which a liquid silicone component containing organopolysiloxane is mixed with metallic silicon powder and then the mixture is allowed to stand for a long period of time.

(ii) A method in which the conditions for mixing a liquid silicone component containing organopolysiloxane with the metallic silicon powder are low shear and long time.

Details are described below.

(i) A method in which a liquid silicone component containing organopolysiloxane is mixed with metallic silicon powder and then the mixture is allowed to stand for a long period of time.

When a liquid silicone rubber composition in which the silicone component containing organopolysiloxane is mixed with the metallic silicon powder is allowed to stand, the amount of bound rubber increases with time. By allowing it to stand for 30 days or more, the bound rubber is sufficiently formed, the shear rate dependence is reduced, and the smoothness is improved. As a mixing method, equipment such as a planetary mixer, a planetary centrifugal mixer, and a kneader is used. The temperature at the time of mixing may be normal temperature or a high temperature of 100 to 200° C.

Further, it may be allowed to stand at room temperature or at a high temperature. When mixing at a high temperature, the component (a) and the component (d) may be mixed in advance to prepare a base compound, and the other components may be mixed thereafter.

Bound rubber formed with rubber used in the tire industry is usually formed in a few hours to a few days. On the other hand, in the composition according to the present disclosure, as described above, it takes a long time to form the bound rubber. The reason is that carbon black, which is a filler blended in rubber used in the tire industry, has a small particle diameter of several tens of nm, is easy to construct a secondary structure, and has a very large surface area. Therefore, bound rubber is formed on the carbon black in a relatively short period of time. However, the metallic silicon powder according to the present disclosure has a larger particle diameter and a smaller surface area than carbon black. Therefore, it is considered that it takes a longer time to form a sufficient amount of bound rubber based on the metallic silicon powder.

(ii) A method in which the conditions for mixing a liquid silicone component containing organopolysiloxane with the metallic silicon powder are low shear and long time.

A planetary mixer is often used as equipment for mixing a silicone component containing organopolysiloxane with metallic silicon powder. The planetary mixer referred to here is equipment having one or more stirring blades, and the stirring blades rotate and revolve to apply shear force by planetary motion to mix materials.

When the liquid silicone rubber composition is usually mixed with a planetary mixer, the revolution speed is set to 40 to 200 rpm and the rotation speed is set to about twice that, and the mixing time is often set to about 5 to 40 minutes. On the other hand, according to the study by the present inventors, it is preferable that the revolution speed is so low as 5 to 15 rpm, preferably 8 to 12 rpm, and most preferably 10 rpm. Moreover, it is preferable that the mixing time is 100 to 300 minutes. After preparing a uniform liquid silicone rubber composition in this way, it is allowed to stand for 4 days or more, and preferably about 4 to 6 days. Through such a step, a sufficient amount of bound rubber is formed on the metallic silicon powder. Although the reason for this is not clear, it is expected that the formation of the bound rubber causes the silicone polymer to permeate into the minute gaps and defects on the surface of the metal silicon particles by capillary action or the like to form a sufficient bound rubber. It is considered that a faster shear rate does not accelerate the wetting of the silicone polymer on the surface of the metallic silicon particles, reduces the capillary action, and affects the amount of bound rubber.

The following methods can be mentioned as a method of obtaining a liquid silicone rubber composition satisfying the requirements for the mass reduction rate according to the present disclosure.

A method of producing the liquid silicone rubber composition including: mixing a silicone component containing organopolysiloxane with metallic silicon powder, and allowing an obtained mixture to stand for 30 days or more.

A method of producing the liquid silicone rubber composition including: mixing a silicone component containing organopolysiloxane with metallic silicon powder using a planetary mixer under conditions of a revolution speed of 5 to 15 rpm and a mixing time of 100 to 300 minutes; and allowing an obtained mixture to stand for 4 days or more.

The fixing member and the thermal fixing device made by using the liquid silicone rubber composition of the present disclosure are described in detail below based on a specific configuration.

Schematic Configuration of the Fixing Member

The details of the fixing member according to an embodiment of the present disclosure are described with reference to the drawings.

The fixing member according to the present disclosure can be, for example, a rotatable member such as a roller shape or an endless belt shape (hereinafter, also referred to as "fixing roller" and "fixing belt," respectively).

Figure 2A:
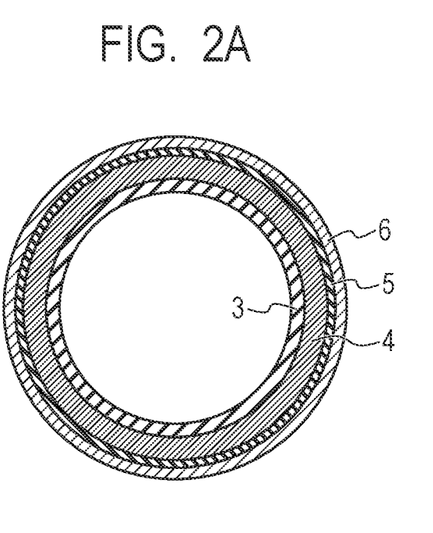
FIG. 2A is a schematic cross-sectional view of a belt-shaped fixing member.
Figure 2B:
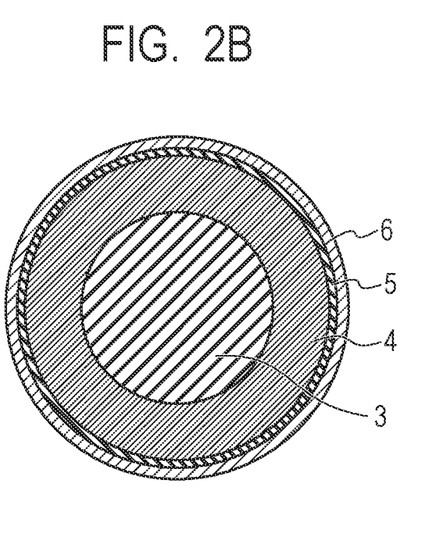
FIG. 2B is a schematic cross-sectional view of a roller-shaped fixing member.

FIG. 2A is a cross-sectional view in the circumferential direction of the fixing belt, and FIG. 2B is a cross-sectional view in the circumferential direction of the fixing roller. As shown in FIGS. 2A and 2B, the fixing member has a substrate 3, an elastic layer 4 on the outer surface of the substrate 3, and a surface layer (release layer) 6 on the outer surface of the elastic layer 4. Further, an adhesive layer 5 may be provided between the elastic layer 4 and the surface layer 6, and in this case, the surface layer 6 is fixed to the outer peripheral surface of the elastic layer 4 with the adhesive layer 5.

Method of Producing the Fixing Member

The fixing member according to the present disclosure can be produced, for example, by a production method including the following steps.

Step of Preparing a Substrate

The material of the substrate is not particularly limited, and a material known in the field of fixing member can be appropriately used. Examples of the material constituting the substrate include metals such as aluminum, iron, nickel and copper, alloys such as stainless steel, and resins such as polyimide.

Here, when the thermal fixing device is a thermal fixing device that heats the substrate by an induction heating method as a means for heating the fixing member, the substrate preferably contains at least one metal selected from the group consisting of nickel, copper, iron, and aluminum. Above all, from the viewpoint of heat generation efficiency, an alloy containing nickel or iron as a main component is preferably used. The main component means the component contained most in the components constituting the target (here, the substrate).

The shape of the substrate can be appropriately selected according to the shape of the fixing member, and can be various shapes such as an endless belt shape, a hollow cylinder shape, a solid columnar shape, and a film shape.

In the case of the fixing belt, the thickness of the substrate is preferably, for example, 15 to 80 μm. By setting the thickness of the substrate within the above range, both strength and flexibility can be achieved at a high level.

Further, the surface of the substrate opposite to the side facing the elastic layer can be provided with, for example, a layer for preventing wear of the inner peripheral surface of the fixing belt when the inner peripheral surface of the fixing belt comes into contact with other members, or a layer for improving slidability with other members.

The surface of the substrate on the side facing the elastic layer may be subjected to surface treatment in order to impart functions such as adhesion to the elastic layer. Examples of surface treatments include physical treatments such as blasting, wrapping, and polishing, and chemical treatments such as oxidation treatments, coupling agent treatments and primer treatments. Further, physical treatment and chemical treatment may be used in combination.

In particular, when an elastic layer containing crosslinked silicone rubber is used, it is preferable to treat the outer surface of the substrate with a primer in order to improve the adhesion between the substrate and the elastic layer. As the primer, for example, it is possible to use a primer in a paint state in which an additive is appropriately blended and dispersed in an organic solvent. Such primers are commercially available. Examples of the additive include a silane coupling agent, a silicone polymer, a hydrogenated methyl siloxane, an alkoxysilane, a reaction accelerating catalyst for hydrolysis/condensation/addition, a coloring agent such as iron oxide, and the like. This primer is applied to the outer surface of the substrate, and is subjected to primer treatment through a process of drying and firing.

The primer can be appropriately selected depending on, for example, the material of the substrate, the type of the elastic layer, the reaction form at the time of crosslinking, and the like. For example, when the material constituting the elastic layer contains a large quantity of unsaturated aliphatic groups, a material containing hydrosilyl groups is preferably used as the primer because the adhesiveness is imparted by the reaction with the unsaturated aliphatic groups. When the material constituting the elastic layer contains a large quantity of hydrosilyl groups, on the contrary, a material containing unsaturated aliphatic groups is preferably used as the primer. In addition, the primer can be appropriately selected depending on the types of the substrate and elastic layer as the adherends, such as a material containing alkoxy groups.

Elastic Layer Forming Step

The elastic layer forming step can include the following steps.

(i) A step of preparing the liquid silicone rubber composition according to the present disclosure.

(ii) A step of forming a layer containing the composition on a substrate (step of forming a composition layer). The composition is applied onto a substrate by a method such as a blade coating method, a nozzle coating method, or a ring coating method to form a layer of the composition.

(iii) A step of curing the composition layer to form an elastic layer (curing step).

Step of Forming an Adhesive Layer and a Surface Layer on an Elastic Layer

Figure 3:
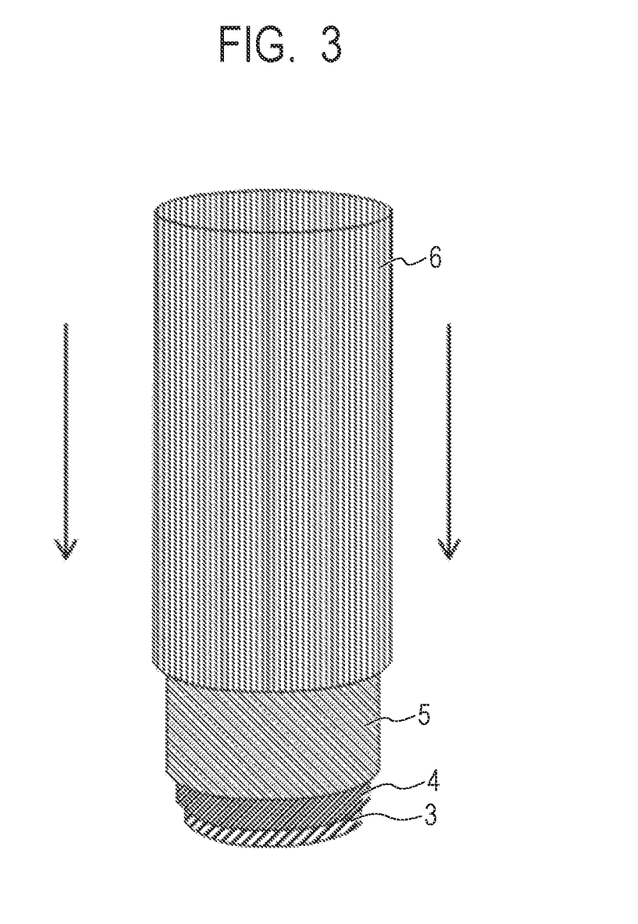
FIG. 3 is a schematic diagram of an example of a step of laminating surface layers.

FIG. 3 is a schematic diagram showing an example of a step of laminating the surface layer 6 in the arrow direction on the elastic layer 4 containing a crosslinked silicone rubber via the adhesive layer 5 formed by using the addition-curable silicone rubber adhesive. First, an adhesive is applied to the surface of the elastic layer 4 formed on the outer peripheral surface of the substrate 3. The adhesive can be appropriately selected from known ones and used, and is not particularly limited, but from the viewpoint of ease of handling, it is preferable to use an addition-curable silicone rubber containing a self-adhesive component. This adhesive can contain, for example, a self-adhesive component, an organopolysiloxane having multiple unsaturated aliphatic groups represented by vinyl groups in its molecular chain, a hydrogenated organopolysiloxane, and a platinum compound as a crosslinking catalyst. By curing the adhesive applied to the surface of the elastic layer by an addition reaction, it is possible to form an adhesive layer 5 for adhering the surface layer 6 to the elastic layer 4.

Note that examples of the self-adhesive component include the following.

- At least one selected from the group consisting of alkenyl groups such as vinyl groups, (meth)acryloxy groups, hydrosilyl groups (SiH groups), epoxy groups, alkoxy silyl groups, carbonyl groups, and phenyl groups, and preferably silanes having two or more functional groups.
- An organosilicon compound such as a cyclic or linear siloxane having 2 or more and 30 or less, preferably 4 or more and 20 or less silicon atoms.
- A non-silicon-based (that is, free of silicon atoms in the molecule) organic compound that may contain oxygen atoms in the molecule. However, one molecule contains 1 or more and 4 or less, preferably 1 or more and 2 or less aromatic rings having a phenylene structure or the like. The phenylene structure has a valence of 1 or more and 4 or less, preferably 2 or more and 4 or less. Further, the phenylene structure contains at least one functional group that can contribute to the hydrosilylation addition reaction (such as an alkenyl group or a (meth)acryloxy group), preferably two or more and four or less in one molecule.

The above self-adhesive component may be used alone or in combination of two or more kinds. Further, from the viewpoint of adjusting the viscosity and ensuring thermal resistance, a filler component can be added to the adhesive within the scope in line with the gist of the present disclosure. Examples of the filler component include the following.

- Silica, alumina, iron oxide, cerium oxide, cerium hydroxide, carbon black, and the like.

The blending amount of each component contained in the adhesive is not particularly limited and can be appropriately set.

Such an addition-curable silicone rubber adhesive is commercially available and can be easily obtained. The thickness of the adhesive layer is preferably 20 µm or less. If the thickness of the adhesive layer is set to 20 µm or less, when the fixing belt is used as a thermal belt in the thermal fixing device, the thermal resistance can be easily set small, and the heat from the inner surface side can be easily transferred to the recording medium efficiently.

Next, the outer surface of the formed adhesive layer 5 is coated with a resin tube for forming the surface layer 6 and laminated. Note that the inner surface of the resin tube can be treated with sodium, excimer laser, ammonia, or the like in advance to improve the adhesiveness.

The surface layer 6 preferably contains a fluororesin in order to exhibit a function as a release layer for preventing toner from adhering to the outer surface of the fixing member. Therefore, for forming the surface layer 6, for example, it is preferable to use a fluororesin tube obtained by molding the fluororesin exemplified below into a tube shape.

Tetrafluoroethylene-perfluoro (alkyl vinyl ether) copolymer (PFA), polytetrafluoroethylene (PTFE), tetrafluoroethylene-hexafluoropropylene copolymer (FEP), and the like.

Among the resin materials exemplified above, PFA is particularly preferably used from the viewpoint of moldability and toner releasability.

The thickness of the surface layer is preferably 10 µm or more and 50 µm or less. By setting the thickness of the surface layer within this range, it is easy to maintain an appropriate surface hardness of the fixing member.

The method of coating the resin tube is not particularly limited, but it is possible to use a method of coating the addition-curing silicone rubber adhesive as a lubricating material, a method of expanding the resin tube from the outside for coating, and the like. Further, the excess addition-curable silicone rubber adhesive remaining between the elastic layer 4 and the surface layer 6 made of the resin tube can be removed by scraping it out by a not-illustrated means. The thickness of the adhesive layer 5 after being scraped out is preferably 20 µm or less from the viewpoint of thermal transferability.

Next, the adhesive layer 5 and the surface layer 6 can be formed on the elastic layer 4 by heating with a heating means such as an electric furnace for a predetermined time to cure and bond the addition-curable silicone rubber adhesive. Note that conditions such as heating time and heating temperature can be appropriately set according to the adhesive or the like used. A fixing member can be obtained by cutting both ends of the obtained member in the width direction to a desired length.

Thermal Fixing Device

The thermal fixing device is configured so that rotating bodies such as a pair of a heated roller and a roller, a belt and a roller, and a belt and a belt are pressure-contacted against each other. The type of the thermal fixing device is appropriately selected in consideration of conditions such as the process speed and the size as the entire electrophotographic image forming apparatus on which the thermal fixing device is mounted.

In the thermal fixing device, the heated fixing member and the pressure member are pressure-contacted to form a fixing nip, and this fixing nip is allowed to sandwich and convey a recording medium to be heated, on which an image is formed by unfixed toner. The image formed by the unfixed toner is called a toner image. As a result, the toner image is heated and pressed. As a result, the toner image is melted and mixed in color, and then cooled to fix the image on the recording medium.

Hereinafter, the configuration of a specific example of the thermal fixing device is described with reference to the drawings, but the scope and applications of the present disclosure are not limited thereto.

Thermal Belt-Pressing Belt Type Thermal Fixing Device

Figure 4:
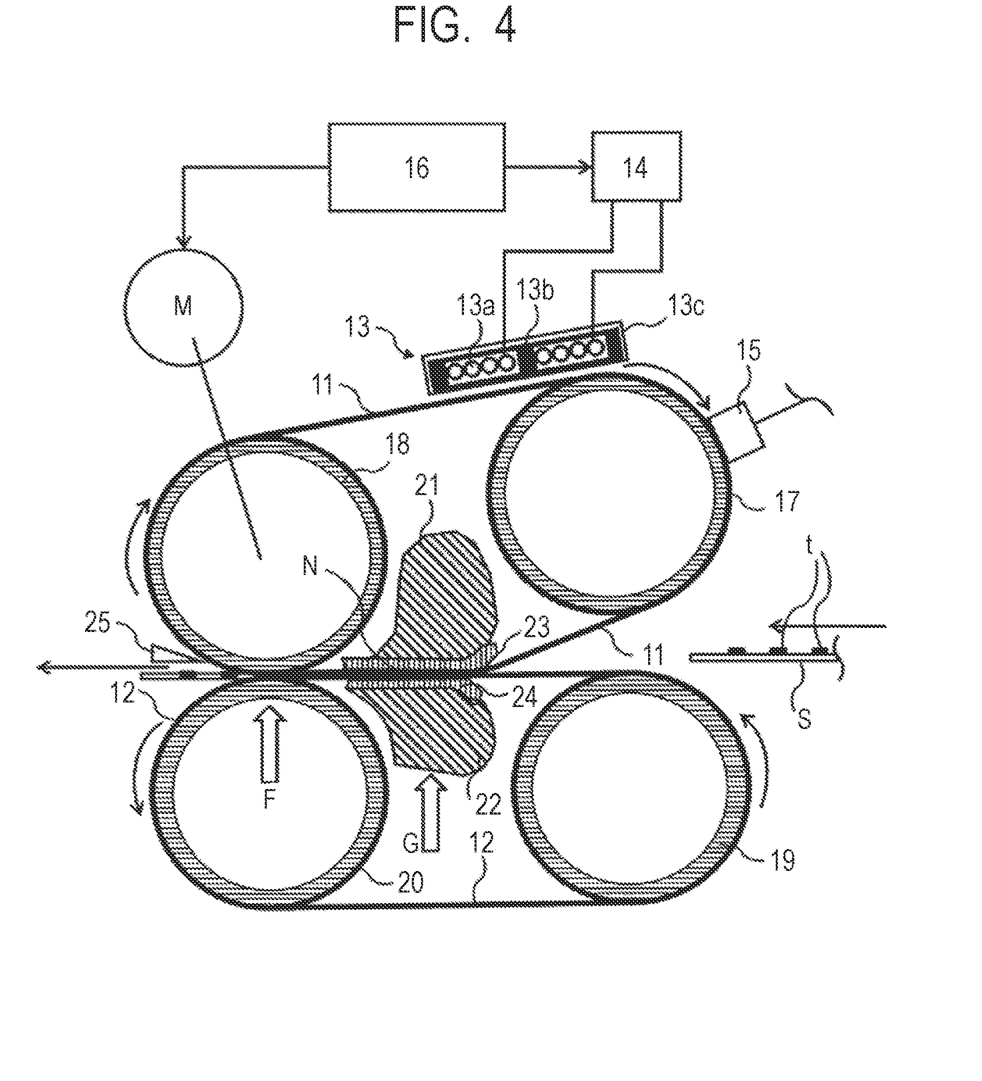
FIG. 4 is a schematic cross-sectional view of an example of a thermal belt-pressing belt type thermal fixing device.

FIG. 4 is a so-called twin belt type thermal fixing device in which a pair of rotating bodies such as a thermal belt 11 and a pressure belt 12 are pressure-contacted, and a schematic cross-sectional view of an example of the thermal fixing device provided with a thermal belt as a heating member. Here, regarding the thermal fixing device or the members constituting the same, the width direction is the direction perpendicular to the paper surface of FIG. 4. Regarding the thermal fixing device, the front surface is the surface on the side where the recording medium S is introduced. Left and right are left or right when the device is viewed from the front. The width of the belt is the dimension of the belt in the left-right direction when the device is viewed from the front. The width of the recording medium S is the dimension of the recording medium in the direction orthogonal to the transport direction. Further, upstream or downstream is upstream or downstream with respect to the transport direction (direction of the arrow) of the recording medium.

This thermal fixing device includes a thermal belt 11 as a fixing member and a pressure belt 12. The thermal belt 11 and the pressure belt 12 are each formed by stretching a thermal belt containing a flexible metallic substrate containing nickel as a main component, as shown in FIG. 2A, on two rollers.

The thermal belt 11 employs a heating source (induction heating member 13, exciting coil) that can be heated by electromagnetic induction heating with high energy efficiency as a heating means. The induction heating member 13 includes an induction coil 13a, an exciting core 13b, and a coil holder 13c that holds them. The induction coil 13a uses a Litz wire flatly wound in an oval shape, and is arranged in a lateral E-shaped exciting core 13b protruding from the center and both sides of the induction coil 13a. Since the exciting core 13b has a high magnetic permeability and a low residual magnetic flux density such as ferrite and permalloy, the loss in the induction coil 13a and the exciting core 13b can be suppressed, and the thermal belt 11 can be heated efficiently.

When a high-frequency current is allowed to flow from the excitation circuit 14 to the induction coil 13a of the induction heating member 13, the substrate of the thermal belt 11 is induced to generate heat and the thermal belt 11 is heated from the substrate side. The surface temperature of the thermal belt 11 is detected by a temperature detecting element 15 such as a thermistor. A signal relating to the temperature of the thermal belt 11 detected by the temperature detecting element 15 is sent to the control circuit unit 16. The control circuit unit 16 controls the power supplied from the excitation circuit 14 to the induction coil 13a so that the temperature information received from the temperature detecting element 15 is maintained at a predetermined fixing temperature, and adjusts the temperature of the thermal belt 11 to a predetermined fixing temperature.

The thermal belt 11 is stretched by a roller 17 as a belt rotating member and a heating side roller 18. The roller 17 and the heating side roller 18 are supported by freely rotating bearings between the not-illustrated left and right side plates of the apparatus, respectively.

The roller 17 is, for example, a hollow iron roller having an outer diameter of 20 mm and an inner diameter of 18 mm and a thickness of 1 mm, and functions as a tension roller that gives tension to the thermal belt 11. The heating side roller 18 is, for example, a highly slidable elastic roller in which a silicone rubber layer as an elastic layer is provided on a core metal made of an iron alloy having an outer diameter of 20 mm and an inner diameter of 18 mm.

A driving force is inputted from the drive source (motor) M as a drive roller via a not-illustrated drive gear train, and the heating side roller 18 is rotationally driven at a predetermined speed in the clockwise direction of the arrow. By providing this heating side roller 18 with an elastic layer as described above, it is possible to satisfactorily transmit the driving force inputted to the heating side roller 18 to the thermal belt 11, and it is possible to form a fixing nip for ensuring the separability of the recording medium from the thermal belt 11. Since the heating side roller 18 has an elastic layer, thermal conduction to the heating side roller is also reduced, which is effective in shortening the warm-up time.

When the heating side roller 18 is rotationally driven, the thermal belt 11 rotates together with the roller 17 due to friction between the surface of the elastic layer of the heating side roller 18 and the inner surface of the thermal belt 11. The arrangement and size of the roller 17 and the heating side roller 18 are selected according to the size of the thermal belt 11.

For example, the dimensions of the roller 17 and the heating side roller 18 are selected so as to stretch the thermal belt 11 having an inner diameter of 55 mm when not attached.

The pressure belt 12 is stretched by a tension roller 19 as a belt rotating member and a pressure side roller 20. The inner diameter of the pressure belt when not attached is, for example, 55 mm. The tension roller 19 and the pressure side roller 20 are supported by freely rotating bearings between the not-illustrated left and right side plates of the apparatus, respectively.

The tension roller 19 is such that, for example, a silicone sponge layer is provided on an iron alloy core metal having an outer diameter of 20 mm and an inner diameter of 16 mm in order to reduce the thermal conductivity and thus the thermal conduction from the pressure belt 12. The pressure side roller 20 is, for example, a low-slidability rigid roller made of an iron alloy having an outer diameter of 20 mm and an inner diameter of 16 mm and a thickness of 2 mm. Similarly, the dimensions of the tension roller 19 and the pressure side roller 20 are selected according to the dimensions of the pressure belt 12.

Here, in order to form a nip portion N between the thermal belt 11 and the pressure belt 12, the pressure side roller 20 is such that the left and right ends of the rotational axis are pressed toward the heating side roller 18 by a not-illustrated pressing mechanism with a predetermined pressing force in the direction of arrow F.

Further, pressure pads are employed in order to obtain a wide nip portion N without increasing the size of the apparatus. They are namely the fixing pad 21 as the first pressure pad that presses the thermal belt 11 toward the pressure belt 12, and the pressure pad 22 as the second pressure pad that presses the pressure belt 12 toward the thermal belt 11. The fixing pad 21 and the pressure pad 22 are supported and arranged between the not-illustrated left and right side plates of the apparatus. The pressure pad 22 is pressed toward the fixing pad 21 with a predetermined pressing force in the direction of the arrow G by a not-illustrated pressing mechanism. The fixing pad 21, which is the first pressure pad, has a sliding sheet (low friction sheet) 23 that is in contact with the pad substrate and the belt. The pressure pad 22, which is the second pressure pad, also has a sliding sheet 24 that is in contact with the pad substrate and the belt. This is because there is a problem that the scraping of the portion that rubs against the belt inner peripheral surface of the pad becomes large. By interposing the sliding sheets 23 and 24 between the belt and the pad substrate, it is possible to prevent scraping of the pad and reduce the sliding resistance, so that good belt running performance and belt durability can be ensured.

Note that the thermal belt 11 is provided with a non-contact static elimination brush (not shown), and the pressure belt 12 is provided with a contact static elimination brush (not shown).

The control circuit unit 16 drives the motor M at least during image formation execution. As a result, the heating side roller 18 is rotationally driven, and the thermal belt 11 is rotationally driven in the same direction. The pressure belt 12 is driven by the thermal belt 11 to rotate. Here, the slip of the belt can be prevented with a configuration where the most downstream portion of the fixing nip is conveyed while being sandwiched between the thermal belt 11 and the pressure belt 12 by the roller pairs 18 and 20. The most downstream portion of the fixing nip is the portion where the pressure distribution (recording medium transport direction) at the fixing nip is maximized.

In a state where the thermal belt 11 rises to a predetermined fixing temperature and is maintained (referred to as temperature control), the recording medium S having an unfixed toner image t is conveyed to the nip portion N between the thermal belt 11 and the pressure belt 12 (in the direction of the arrow). The recording medium S is introduced with the surface carrying the unfixed toner image t facing toward the thermal belt 11. Then, the unfixed toner image t of the recording medium S is sandwiched and conveyed while being in close contact with the outer peripheral surface of the thermal belt 11, so that it is imparted with heat from the thermal belt 11, and receives a pressing force and is fixed to the surface of the recording medium S. At this time, the heat from the heated substrate of the thermal belt 11 is efficiently conveyed toward the recording medium S through the elastic layer having enhanced thermal conductivity in the thickness direction. After that, the recording medium S is separated from the thermal belt and conveyed by the separating member 25 (in the direction of the arrow).

Thermal Belt-Pressing Roller Type Thermal Fixing Device

Figure 5:
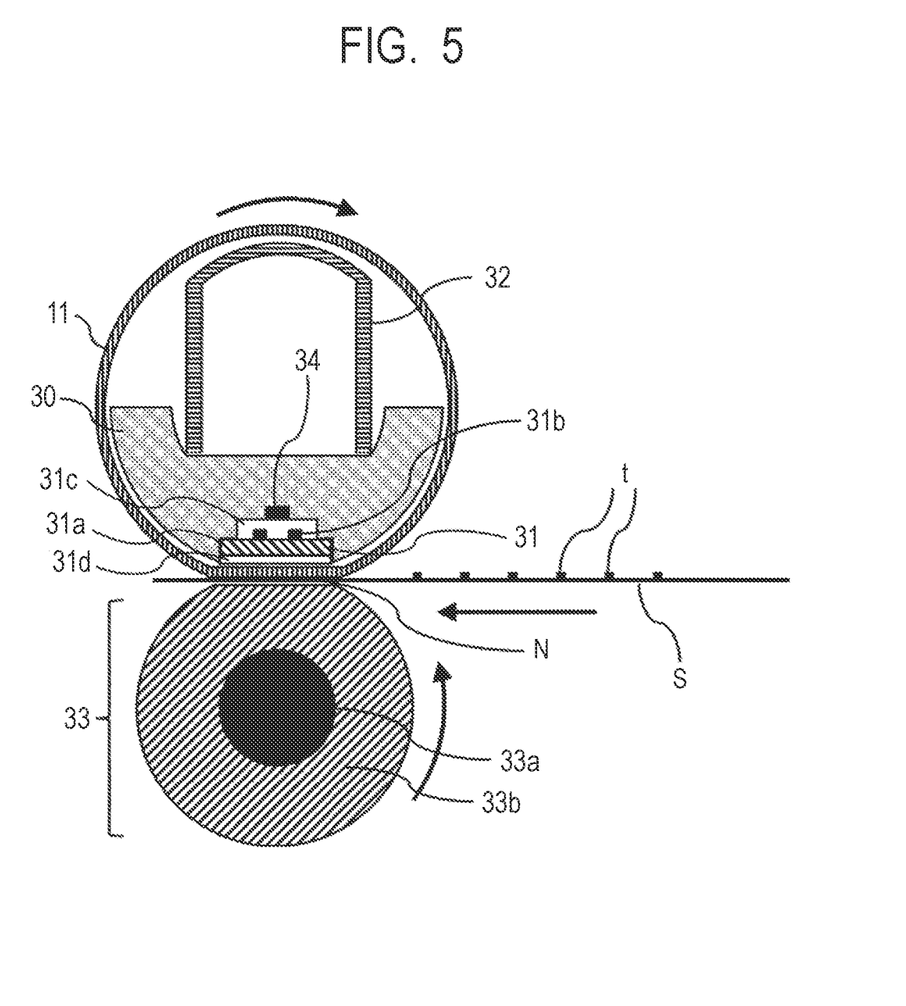
FIG. 5 is a schematic cross-sectional view of an example of a thermal belt-pressing roller type thermal fixing device.

FIG. 5 is a schematic diagram showing an example of a thermal belt-pressing roller type thermal fixing device using a ceramic heater as a heating unit. In FIG. 5, reference numeral 11 denotes a cylindrical or endless belt-shaped thermal belt, and the fixing member can be used. In order to hold the thermal belt 11, there is a thermal-resistant and heat-insulating belt guide 30. At a position in contact with the thermal belt 11 (almost the center of the lower surface of the belt guide 30), a ceramic heater 31 that heats the thermal belt 11 is fitted into a groove formed and provided along the length of the guide and fixedly supported. The thermal belt 11 is loosely fitted to the belt guide 30. Further, the pressing rigid stay 32 is inserted inside the belt guide 30.

On the other hand, the pressure roller 33 is arranged so as to face the thermal belt 11. Note that in the present disclosure, the pressure roller 33 is an elastic pressure roller, that is, a core metal 33a provided with an elastic layer 33b of silicone rubber to reduce the hardness. Both ends of the core metal 33a are arranged so as to be rotatably held between the not-illustrated front side and back side chassis side plates of the apparatus. Note that the elastic pressure roller is coated with a PFA (tetrafluoroethylene/perfluoroalkyl ether copolymer) tube in order to improve the surface property.

By providing pressure springs (not shown) between both ends of the pressing rigid stay 32 and the spring receiving members (not shown) on the apparatus chassis side, respectively, a pushdown force is applied to the pressing rigid stay 32. As a result, the lower surface of the ceramic heater 31 arranged on the lower surface of the belt guide 30 made of heat-resistant resin and the upper surface of the pressure roller 33 are pressed against each other with the thermal belt 11 interposed therebetween to form a fixing nip portion N.

The pressure roller 33 is rotationally driven in the counterclockwise direction as shown by the arrow by a not-illustrated driving means. A rotational force acts on the thermal belt 11 by the frictional force between the pressure roller 33 and the outer surface of the thermal belt 11 due to the rotational drive of the pressure roller 33. The inner surface of the thermal belt 11 is in close contact with the lower surface of the ceramic heater 31 at the fixing nip portion N. Then, the thermal belt 11 in close contact with the lower surface of the ceramic heater 31 rotates about the belt guide 30 in the clockwise direction at a peripheral speed substantially corresponding to the rotational peripheral speed of the pressure roller 33 clockwise as shown by the arrow while sliding in close contact (pressure roller drive method).

The rotation of the pressure roller 33 is started based on the print start signal, and the heating up of the ceramic heater 31 is started. The rotational peripheral speed of the thermal belt 11 due to the rotation of the pressure roller 33 becomes steady, and the temperature of the temperature detecting element 34 provided on the upper surface of the ceramic heater rises to a predetermined temperature, for example, 180° C. At that moment, the recording medium S carrying the unfixed toner image t as the heated material is introduced between the thermal belt 11 and the pressure roller 33 in the fixing nip portion N in the direction of the arrow with the toner image carrying side facing the thermal belt 11. Then, the recording medium S comes into close contact with the lower surface of the ceramic heater 31 via the thermal belt 11 at the fixing nip portion N, and moves and passes through the fixing nip portion N together with the thermal belt 11. In the process of moving and passing, the heat of the thermal belt 11 is imparted to the recording medium S, and the toner image t is heated and fixed on the surface of the recording medium S. The recording medium S that has passed through the fixing nip portion N is separated from the outer surface of the thermal belt 11 and conveyed.

The ceramic heater 31 as a heating unit is a horizontally long linear heating unit with a low thermal capacity having a longitudinal direction perpendicular to the moving direction of the thermal belt 11 and the recording medium S. The ceramic heater 31 preferably includes, as a basic configuration, a heater substrate 31a, a heat generating layer 31b provided on the surface of the heater substrate 31a along the length thereof, a protective layer 31c further provided thereon, and a sliding member 31d. Here, the heater substrate 31a can be made of aluminum nitride or the like. The heat generating layer 31b can be formed by applying an electric resistance material such as Ag/Pd (silver/palladium) to about 10 μm and a width of 1 to 5 mm by screen printing or the like. The protective layer 31c can be made of glass, fluororesin, or the like. Note that the ceramic heater used in the thermal fixing device is not limited to such a heater.

Then, by energizing between both ends of the heat generating layer 31b of the ceramic heater 31, the heat generating layer 31b generates heat and the heater 31 rapidly rises in temperature. The ceramic heater 31 is fixedly supported by being fitted, with the protective layer 31c side upward, into a groove formed and provided along the length of the guide in a substantially central portion of the lower surface of the belt guide 30. The surface of the sliding member 31d of the ceramic heater 31 and the inner surface of the thermal belt 11 slide in mutual contact with the fixing nip portion N in contact with the thermal belt 11.

As described above, the thermal belt 11 increases the thermal conductivity of the elastic layer containing silicone rubber in the thickness direction and keeps the hardness low. With such a configuration, the thermal belt 11 can efficiently heat the unfixed toner image and has a low hardness, so that a high-quality image can be fixed on the recording medium S at the time of fixing nip.

As described above, by using the liquid silicone rubber composition of the present disclosure, it is possible to provide a thermal fixing device in which a fixing member having excellent fixing performance and image quality is arranged.

According to an embodiment of the present disclosure, there is provided a silicone rubber composition capable of forming a member having high thermal conductivity, low thermal capacity, and excellent smoothness.

EXAMPLES

Hereinafter, the present disclosure is described in more detail with reference to Examples.

Example 1

(1) Preparation of Liquid Silicone Rubber Composition

First, the component (a) prepared was 100 parts by mass of silicone polymer having vinyl groups as unsaturated aliphatic groups only at both ends of the molecular chain and methyl groups as unsubstituted hydrocarbon groups free of other unsaturated aliphatic groups (hereinafter referred to as "Vi"). As Vi, trade name: DMS-V35, manufactured by Gelest, a viscosity of 5000 mm$^2$/s was used. Note that in the structural formula (2), the silicone polymer is a polymer in which $R^3$ is a methyl group and $R^4$ is a vinyl group.

Then, to this Vi, metallic silicon powder whose surface had been oxidation-treated (trade name: M-Si #350 WB, manufactured by KINSEI MATEC CO., LTD., average particle diameter 12 μm) as the component (d) was blended to 40% by volume based on the silicone component. The mixture was set in a planetary centrifugal mixer (manufactured by THINKY CORPORATION, model ARV-310), and stirred and mixed at 2000 rpm for 4 minutes to obtain a mixture 1.

Then, the mixture 1 was allowed to stand at room temperature for 46 days.

Next, 0.22 parts by mass of a 90 wt % IPA solution of 1-ethynyl-1-cyclohexanol (manufactured by Tokyo Chemical Industry Co., Ltd.) as a curing retarder, 0.1 parts by mass of a hydrosilylation catalyst (platinum catalyst: a mixture of 1,3-divinyltetramethyldisiloxane platinum complex, 1,3-divinyltetramethyldisiloxane, and 2-propanol) as the component (c), and 1.5 parts by mass of a silicone polymer having a linear siloxane skeleton and having active hydrogen groups bonded to silicon only in the side chain (trade name: HMS-301, manufactured by Gelest, viscosity 30 mm$^2$/s) were weighed, which was added to the mixture 1, set in a planetary centrifugal mixer (manufactured by THINKY CORPORATION, model ARV-310), and stirred and mixed under reduced pressure at 600 rpm for 4 minutes to obtain a liquid silicone rubber composition.

(2) Preparation of Sample Sheet

A film applicator (manufactured by Allgood Co., Ltd.) was used to coat a stainless steel (SUS304) film having a thickness of 50 μm with the liquid silicone rubber composition at a rate of 10 mm/sec so that the film thickness was 250 μm. Then, the liquid silicone rubber composition was firstly cured by heating at a temperature of 160° C. for 1 minute, and then the silicone rubber composition layer was secondarily cured by heating at a temperature of 200° C. for 30 minutes to prepare a sample sheet.

Comparative Example 1

A liquid silicone rubber composition and a sample sheet were prepared in the same manner as in Example 1 except that the static storage period was set to 3 hours.

Example 2

A liquid silicone rubber composition and a sample sheet were prepared in the same manner as in Example 1 except that the amount of the metallic silicon powder blended was set to 37% by volume and the static storage period was set to 40 days.

Comparative Example 2

A liquid silicone rubber composition and a sample sheet were prepared in the same manner as in Example 2 except that the static storage period was set to 10 days.

Example 3

The silicone polymer used as Vi was changed to trade name: DMS-V41, manufactured by Gelest, a viscosity of 10000 mm$^2$/s. Then, the amount of the metallic silicon powder blended was set to 43% by volume and the static storage period was set to 180 days. A liquid silicone rubber composition and a sample sheet were prepared in the same manner as in Example 1 except for the above.

Comparative Example 3

A liquid silicone rubber composition and a sample sheet were prepared in the same manner as in Example 3 except that the static storage period was set to 6 days.

Example 4

A liquid silicone rubber composition and a sample sheet were prepared in the same manner as in Example 1 except that the static storage period was set to 30 days using metallic silicon powder (trade name: M-Si FineWB, manufactured by KINSEI MATEC CO., LTD., average particle diameter 3 μm).

Comparative Example 4

A liquid silicone rubber composition and a sample sheet were prepared in the same manner as in Example 4 except that the static storage period was set to 3 hours.

Example 5

First, as Vi, 100 parts by mass of trade name: DMS-V42, manufactured by Gelest, and viscosity of 20000 mm$^2$/s were prepared. Note that in the structural formula (2), the silicone polymer is a polymer in which $R^3$ is a methyl group and $R^4$ is a vinyl group.

Then, to this Vi, metallic silicon powder whose surface had been oxidation-treated (trade name: M-Si #350 WB, manufactured by KINSEI MATEC CO., LTD., average particle diameter 12 μm) as the component (d) was blended to 40% by volume based on the silicone component. The mixture was set in a planetary mixer (manufactured by PRIMIX Corporation, model HIVIS MIX Model 2P-01), and stirred and mixed at 10 rpm for 160 minutes to obtain a mixture 2. Then, the mixture 2 was allowed to stand at room temperature for 5 days.

In the following procedure, a liquid silicone rubber composition and a sample sheet were prepared in the same manner as in Example 1.

Comparative Example 5

A liquid silicone rubber composition and a sample sheet were prepared in the same manner as in Example 5 except that the mixture of the component (a) and the component (d) was set in a planetary centrifugal mixer (manufactured by THINKY CORPORATION, model ARV-310), and stirred and mixed at 2000 rpm for 4 minutes, in the same manner as in Example 1.

(Evaluation)

For the liquid silicone rubber compositions of Examples 1 to 5 and Comparative Examples 1 to 5, the viscosity was measured, the TGA was measured, and the mass reduction rate was calculated by the following method. Specifically, it is as follows.

<Viscosity Measurement>

The viscosity of the liquid silicone rubber composition at shear was measured using a rotary shear rheometer (trade name: DHR-2; manufactured by TA Instruments). As the measurement conditions, a parallel plate having a diameter of 20 mm was used, and with a gap distance of 1 mm, a temperature of 25° C., a pre-shear of 0.1/sec for 10 seconds, and a standby time of 5 seconds, the shear rate between 0.01/sec and 10/sec was measured at 10 points per decimal number. The measurement was performed such that the equilibrium time was 3 seconds and the data acquisition time was 3 seconds at each point. From the relationship between the obtained shear rate and the viscosity, the viscosity A for a shear rate of 0.02/sec and the viscosity B for a shear rate of 1/sec were read, and the ratio (A/B) between them was calculated.

<TGA Measurement and Calculation of Mass Reduction Rate>

A 0.5 g sample was collected from the liquid silicone rubber composition and mixed with 9 ml of toluene at 25° C. Then, a centrifuge (manufactured by Kubota Corporation Co., Ltd.: High Speed Refrigerated Centrifuge 7780) was used to precipitate the metal silicon particles by centrifugation at 25° C. and 10000 rpm for 5 minutes. The obtained precipitates were subjected to vacuum filtration washing three times with 10 ml of toluene at 25° C. using a Kiriyama funnel having a diameter of 40 mm and a filter paper No. 5C (reserved particles 1 μm) for the Kiriyama funnel to extract metallic silicon particles contained in the sample. The obtained metallic silicon particles were dried at a temperature of 120° C. for 1 hour, weighed at 50 mg, and subjected to TGA measurement. As the TGA device, "TGA/DSC 3+" (trade name) manufactured by METTLER TOLEDO was used, and the temperature was raised from 50° C. to 500° C. at 5° C./min under 80 ml/min of dry air, and the mass change at that time was measured. From the obtained mass change data, the mass change at 300 to 500° C. was calculated and used as the mass reduction rate (%).

<Surface Roughness>

Moreover, the arithmetic average surface roughness Ra was measured for the sample sheets of Examples 1 to 5 and Comparative Examples 1 to 5. A surface roughness measuring machine (Surfcorder SE3500 manufactured by Kosaka Laboratory Ltd.) was used for the measurement, and the evaluation was performed at an evaluation length of 4 mm, a cutoff of 0.8 mm, and a speed of 0.2 mm/sec.

TABLE 1

| | Metallic Silicon Particle | | | | | | Viscosity | | | Mass Reduction | Surface Roughness |
|---|---|---|---|---|---|---|---|---|---|---|---|
| | Component (a) | | Volume Average Particle Diameter (μm) | Amount Blended (Vol %) | Mixing Method | Static Storage Period | Viscosity A Pa?sec | Viscosity B Pa?sec | A/B | Rate (%) | Ra (μm) |
| | Viscosity (mm²/sec) | Material Name | | | | | | | | | |
| Example 1 | 5000 | "350WB" | 12 | 40 | Planetary Centrifugal Mixer | 46 Days | 163 | 90 | 1.8 | 0.37 | 1.62 |
| Comparative Example 1 | 5000 | "350WB" | 12 | 40 | Planetary Centrifugal Mixer | 3 Days | 604 | 155 | 3.9 | 0.18 | 1.83 |
| Example 2 | 5000 | "350WB" | 12 | 37 | Planetary Centrifugal Mixer | 40 Days | 157 | 98 | 1.6 | 0.39 | 1.54 |
| Comparative Example 2 | 5000 | "350WB" | 12 | 37 | Planetary Centrifugal Mixer | 10 Days | 327 | 107 | 3.1 | 0.22 | 1.97 |
| Example 3 | 10000 | "350WB" | 12 | 43 | Planetary Centrifugal Mixer | 180 Days | 226 | 192 | 1.2 | 0.63 | 2.19 |
| Comparative Example 3 | 10000 | "350WB" | 12 | 43 | Planetary Centrifugal Mixer | 6 Days | 704 | 207 | 3.4 | 0.22 | 2.49 |
| Example 4 | 5000 | "FineWB" | 3 | 40 | Planetary Centrifugal Mixer | 30 Days | 92 | 102 | 0.9 | 0.8 | 0.9 |
| Comparative Example 4 | 5000 | "FineWB" | 3 | 40 | Planetary Centrifugal Mixer | 3 Days | 19736 | 530 | 37.2 | −0.2 | 3.58 |
| Example 5 | 20000 | "350WB" | 12 | 40 | Planetary Mixer | 5 Days | 345 | 326 | 1.1 | 0.59 | 2.23 |
| Comparative Example 5 | 20000 | "350WB" | 12 | 40 | Planetary Centrifugal Mixer | 5 Days | 789 | 372 | 2.1 | 0.27 | 2.41 |

It can be seen from the results in Table 1 that comparing the Examples and the Comparative Examples, in all blends, those in which the ratio A/B of viscosity A with a shear rate of 0.02/sec to viscosity B with 1/sec is 2.0 or less have small surface roughness values and improved smoothness. Further, it can be seen that when the ratio A/B is 2.0 or less, the TGA reduction rate is 0.3% or more and the amount of bound rubber is large.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-021313, filed Feb. 12, 2021, which is hereby incorporated by reference herein in its entirety.

What is claimed is:

1. A liquid silicone rubber composition containing metallic silicon particles, wherein
   a content of the metallic silicon particles is 35% by volume or more and 45% by volume or less,
   a volume average particle diameter of the metallic silicon particles is 1 μm or more and 20 μm or less, and
   wherein a ratio A/B is 2.0 or less, where A denotes a viscosity of the liquid silicone rubber composition at a share rate of 0.02/sec, and B denotes a viscosity of the liquid silicone rubber composition at share rate of 1/sec.

2. The liquid silicone rubber composition according to claim 1, wherein the liquid silicone rubber composition contains the following components (a) to (c):
   component (a): organopolysiloxane having an unsaturated aliphatic group;
   component (b): organopolysiloxane having active hydrogen bound to silicon; and
   component (c): a catalyst.

3. A method of producing the liquid silicone rubber composition according to claim 1, comprising:
   mixing a silicone component containing organopolysiloxane with metallic silicon powder, and
   allowing the obtained mixture to stand for 30 days or more.

4. A method of producing the liquid silicone rubber composition according to claim 1, comprising:
   mixing a silicone component containing organopolysiloxane with metallic silicon powder using a planetary mixer under conditions of a revolution speed of 5 to 15 rpm and a mixing time of 100 to 300 minutes; and allowing the obtained mixture to stand for 4 days or more.

5. A liquid silicone rubber composition containing metallic silicon particles, wherein the metallic silicon particles have a mass reduction rate of 0.3% or more, the mass reduction rate being determined by steps:
   (i) collecting 0.5 grams of the liquid silicone rubber composition as a sample;
   (ii) extracting the metallic silicon particles from the sample; and
   (iii) subjecting the metallic silicon particles extracted from the sample to a thermogravimetric analysis and measuring the mass reduction rate in a temperature range from 300° C. to 500° C.,
wherein, the step (ii) includes
   mixing the sample with 9 ml of toluene whose temperature is 25° C. to obtain a mixture;
   centrifuging the mixture at 10000 rpm for 5 minutes to obtain a precipitate; and
   washing the precipitate 3 times by vacuum filtration with 10 ml of toluene whose temperature is 25° C. to obtain the extracted metallic silicon particles.

6. The liquid silicone rubber composition according to claim 5, wherein the liquid silicone rubber composition contains the following components (a) to (c):
   component (a): organopolysiloxane having an unsaturated aliphatic group;
   component (b): organopolysiloxane having active hydrogen bound to silicon; and
   component (c): a catalyst.

7. A method of producing the liquid silicone rubber composition according to claim 5, comprising:
   mixing a silicone component containing organopolysiloxane with metallic silicon powder, and
   allowing the obtained mixture to stand for 30 days or more.

8. A method of producing the liquid silicone rubber composition according to claim 5, comprising:
   mixing a silicone component containing organopolysiloxane with metallic silicon powder using a planetary mixer under conditions of a revolution speed of 5 to 15 rpm and a mixing time of 100 to 300 minutes; and
   allowing the obtained mixture to stand for 4 days or more.

* * * * *